(12) United States Patent
Toncelli

(10) Patent No.: US 7,766,807 B2
(45) Date of Patent: Aug. 3, 2010

(54) ROLLER STRUCTURE AND METHOD FOR THE MANUFACTURE THEREOF

(76) Inventor: Dario Toncelli, Via San Pancrazie 3-36061, Bassano del Grappa (Vicenza) (IT)

( * ) Notice: Subject to any disclaimer, the term of this patent is extended or adjusted under 35 U.S.C. 154(b) by 723 days.

(21) Appl. No.: 10/861,056

(22) Filed: Jun. 4, 2004

(65) Prior Publication Data

US 2004/0235629 A1 Nov. 25, 2004

Related U.S. Application Data

(63) Continuation of application No. PCT/EP03/03673, filed on Apr. 9, 2003.

(51) Int. Cl.
*F16C 13/00* (2006.01)
*B21K 1/02* (2006.01)

(52) U.S. Cl. .................. 492/53; 492/3; 492/48; 492/54; 29/895.32; 29/895.3

(58) Field of Classification Search .............. 492/3, 492/48, 53, 54; 29/895.32, 895.3
See application file for complete search history.

(56) References Cited

U.S. PATENT DOCUMENTS

| 1,787,890 | A | * | 1/1931 | Woodward | 492/28 |
|---|---|---|---|---|---|
| RE18,111 | E | * | 6/1931 | Woodward | 492/28 |
| 2,353,194 | A | * | 7/1944 | Metzner | 29/469 |
| 2,983,990 | A | * | 5/1961 | Stevenson et al. | 492/37 |
| 3,079,273 | A | * | 2/1963 | Johnson | 427/228 |
| 3,079,316 | A | * | 2/1963 | Johnson | 376/416 |
| 3,100,676 | A | | 8/1963 | Christie | |
| 3,852,862 | A | * | 12/1974 | Sukenik | 492/50 |
| 3,861,012 | A | * | 1/1975 | Spaeder, Jr. | 492/3 |
| 4,604,781 | A | | 8/1986 | Rankin, III | |
| 4,704,776 | A | * | 11/1987 | Watanabe et al. | 492/54 |
| 4,708,756 | A | * | 11/1987 | Busen et al. | 156/143 |
| 5,053,284 | A | * | 10/1991 | Noda et al. | 428/552 |
| 5,161,306 | A | * | 11/1992 | Nakahira et al. | 29/895.32 |
| 5,174,823 | A | | 12/1992 | Dario | |
| 5,261,477 | A | | 11/1993 | Brunet et al. | |
| 5,755,033 | A | * | 5/1998 | Gunter et al. | 29/895.32 |
| 6,110,084 | A | * | 8/2000 | Kanno et al. | 492/1 |
| 7,200,935 | B2 | * | 4/2007 | Davenport | 29/895 |
| 2004/0192528 | A1 | * | 9/2004 | Fukase et al. | 492/53 |

FOREIGN PATENT DOCUMENTS

JP      60004616 A  *  1/1985
JP      7-155624        6/1995

* cited by examiner

*Primary Examiner*—Essama Omgba
(74) *Attorney, Agent, or Firm*—Katten Muchin Rosenman LLP

(57) ABSTRACT

A core is provided with a coating formed by an agglomerate obtained by hardening of a mixture comprising a granulated stone material, preferably of the type having a high hardness factor and light color, and a hardening resin, preferably an epoxy resin, for manufacturing a roller or cylinder of a non-porous external surface, the roller being used for the processing of materials and products. For the manufacture of the roller, a formwork having a cavity for housing a core is prepared so as to provide an interspace which is filled with the mixture, following which compacting of the mixture present in the interspace and then the resin hardening step are performed to obtain a non-porous agglomerate.

23 Claims, 1 Drawing Sheet

ROLLER STRUCTURE AND METHOD FOR THE MANUFACTURE THEREOF

CROSS REFERENCE TO RELATED APPLICATIONS

This is a continuation of International Application PCT/EP03/03673 filed Apr. 9, 2003, and claims priority under 35 U.S.C. §119 from Italian Application TV2002A000044 filed Apr. 18, 2002.

FIELD OF THE INVENTION

The present invention relates to rollers or cylinders used in the devices for the processing of materials or products as well as to the method for the manufacture thereof.

DESCRIPTION OF THE PRIOR ART

In the description which follows reference will be made to rollers used in so-called "clod-breaking" devices for crushing clods or aggregates, it being understood that this is not intended to limit the scope of the invention, but only provide an example.

Clod-breaking devices are at present used in the technology for the manufacture of conglomerates or agglomerates formed by a granulated stone material and a binder (either of the inorganic type, such as for example a cement binder, or organic type, such as a hardening synthetic resin). In this technology, it is required to control, downstream of the mixing machines, the size of the aggregates or "clods" in the mixture formed by the abovementioned granulate and the binder, before the mixture is transferred to the forming station and in particular before it is introduced into the forming mould.

U.S. Pat. No. 5,174,823 describes and illustrates a device for controlling the nature of the agglomerations of mixtures of the aforementioned type, said controlling operation relating to both the particle size and to the homogeneous distribution of the stone granulates inside the mixture. The device in question comprises two rollers arranged with their respective axes parallel and spaced in an adjustable manner so as to set the distance between the two adjacent cylindrical surfaces to the desired value for the maximum size of the clods or mixture aggregates in the final products. Preferably the two rollers are made to rotate at varying peripheral speeds and for this purpose a separate drive system is envisaged for each roller. The two rollers are normally made of steel and are subject to wear in particular in the case of particularly hard and/or abrasive products and materials (such as, for example, quartziferous aggregates); when the wear reaches given levels, processing must be stopped so as not to adversely affect the quality of the final products. During the stop the steel rollers are removed from the device where they are used, ground and reassembled. Obviously, these operations are complex, costly and in particular of a duration such that they interrupt for a not insignificant amount of time the cycle for processing of the agglomerates of stone materials.

In an attempt to overcome this drawback it has been proposed to manufacture the rollers using a ceramic material instead of steel, but with a limited degree of success since ceramic materials have mechanical characteristics which are unsuitable for withstanding other types of stresses which are present during the abovementioned processing. It has also been suggested to chrome-plate the steel rollers in order to make their surface harder, but it has been found that chrome-plating releases metal oxides and/or other pigmented substances which, when in contact with the mixture, in particular if this is light-colored, may alter the chromatic properties thereof, this being a not insignificant drawback considering that the aesthetic appearance is of great importance in the final products obtained with the mixture in question. Moreover, this drawback is also encountered in the case of stainless steel rollers.

Finally, it is worth mentioning the following publications, even if their teachings cannot be of utility for the present invention:

JP 07-155624 disclosing a grinding roller made uniquely of quartz glass, thus with a non-porous surface, and secured to a metal shaft through a layer of organic resin;

U.S. Pat. No. 4,604,781 disclosing a roller having a non-porous grinding surface made with an alloy. The composition of the alloy does not include a resin;

U.S. Pat. No. 3,100,676 disclosing a method for manufacturing a printing roll by molding onto a shaft an elastomeric material, which does not include any stone or ceramic material, with the use of a frangible glass tube as a mould;

U.S. Pat. No. 5,261,477 disclosing an infiltration technique with a soldering alloy as binder metal in a layer filled with grains of melted tungsten carbide to produce parts with an abrasion-proof surface.

SUMMARY OF THE INVENTION

It would be desirable, and in fact forms a first object of the present invention, to provide rollers which have a high wear resistance, are mechanically strong and do not release substances able to alter the aesthetic appearance of the materials undergoing processing.

Another object of the invention is to provide a method for manufacturing the rollers which can be easily implemented, using techniques which are well-known per se and without a major financial investment.

These and other objects of the invention are achieved with a roller or cylinder having a non-porous external surface for the processing of materials and products, in particular for crushing and controlling the particle size of the aggregates or clods, formed by a mixture of at least one granulated stone material of suitable hardness and at least one binder, the roller being characterized in that the said surface consists of a non-porous agglomerate formed by a hardenable mixture comprising a granulated stone material of suitable hardness and a hardening resin as a binder.

In the preferred embodiment of the roller or cylinder according to the present invention, said agglomerate forms the coating, having a suitable thickness, of a cylindrical core or nucleus of the roller, said core being made of a mechanically resistant material, such as steel for example. The stone material forming said agglomerate is in the form of a granulate having a controlled particle size scale (normally ranging between 0.1 and 2.0 mm) and chosen from among stone materials having a high hardness factor and a light color. As regards the core or nucleus of the roller, it is hollow and is also preferably metallic and cylindrical, even though this must not be understood as being a limitation in consideration that the shape of the core is not important while the external surface of the agglomerate coating formed onto the core has to be of a perfectly cylindrical shape. Quartziferous aggregates, which combine a light color with a high hardness factor, are particularly preferred as stone materials forming the said granulate. As regards the hardening resin forming the binder of said agglomerate, it is preferably an epoxy resin which can be hardened by means of reaction with a suitable hardener, even though other synthetic resins, such as for example polyester resins, may also be used.

In order to favor gripping of the coating of agglomerate to the core or nucleus of the roller or cylinder, the outer surface of the core or nucleus, i.e. that which is in contact with the agglomerate, is preferably roughened, for example by means of sandblasting. As an alternative and/or in addition, the outer surface of the core may be provided with grooves or ribs which improve the abovementioned gripping action. Obviously the core of the roller is hollow so as receive the components for mounting the said roller in the device used as well as the driving components.

In turn, the method according to the present invention is characterized in that the formation of the coating layer of agglomerate is performed after a casing or formwork has been prepared having an internal cavity with a shape and a size corresponding to the external shape of the roller to be manufactured. More specifically the method for manufacturing rollers of the above defined type and having a non-porous external surface comprises the following steps:

preparation of a casing or formwork having an internal cavity with a shape and size corresponding to the external shape of the roller to be manufactured;

insertion, into said cavity, of a core so as to create an interspace having a thickness corresponding to the thickness of the roller to be manufactured;

filling of said interspace with a mixture able to constitute the said external surface, extraction of the finished roller from said casing or formwork, and characterized in that it also comprises the steps of:

compaction, if necessary, of the mixture contained in said interspace, the said mixture comprising a granulated stone material of a suitable hardness and a hardening resin as a binder;

hardening of the resin in said casing or formwork so as to obtain that the external surface of the roller consists of a non-porous agglomerate.

In order to improve the mechanical characteristics of the coating of agglomerate it is preferable to perform compaction of the mixture which fills the aforementioned interspace. In the preferred embodiment of the method according to the present invention, this compaction is performed by arranging the casing or formwork, after filling with the aforementioned mixture, inside a chamber or bell in which an intense vacuum of predetermined value is established, while, at a first axial ends of the formwork, a pressing piston having a annular cross-section corresponding to the cross-sectional shape of the aforementioned interspace is operated at the same time so that its active surface acts exclusively on the surface of the mixture present in the said interspace. Obviously, at the second end of the formwork, a counter-plate must be provided in order to prevent the mixture, when subject to the action of the pressing piston, from coming out of this end. At the same time a vibratory movement of predetermined frequency is applied to the pressing piston.

These combined and coordinated actions result in optimum compaction of the mixture which fills the interspace without porosity, especially on the surface, and with a homogeneous and uniform distribution of the resin, even though this is used in a minimum amount. During the following step, hardening of the mixture present in the aforementioned interspace and then disassembly of the casing or external formwork are performed.

DETAILED DESCRIPTION OF THE INVENTION

Figure 1:
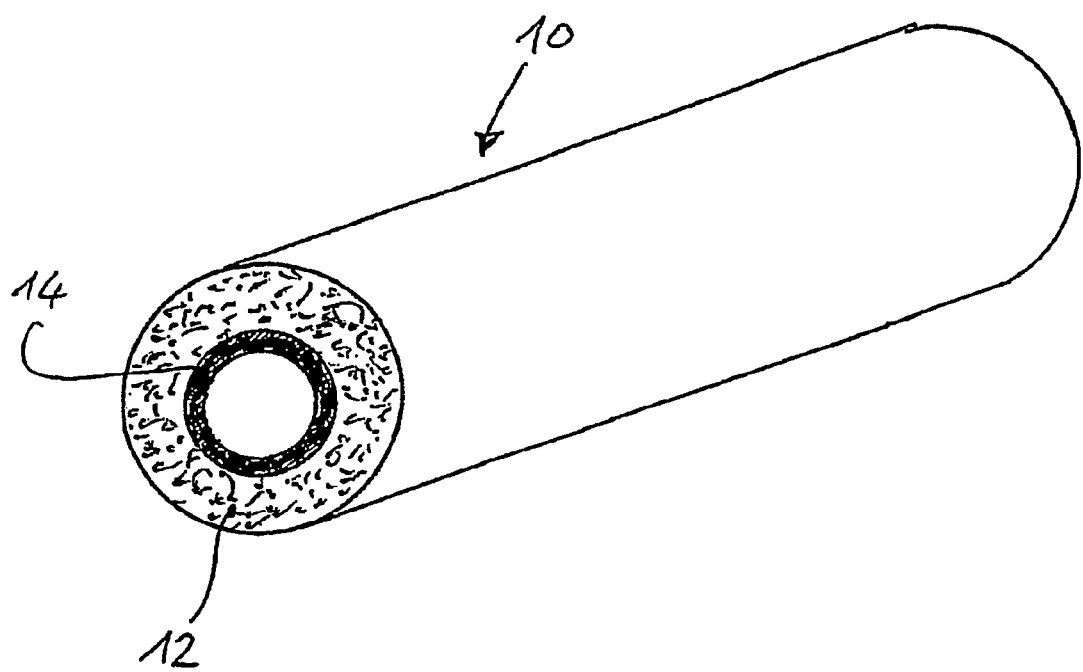
FIG. 1 illustrates one embodiment of a roller or cylinder of the present invention.

The resulting roller or cylinder is shown by way of example in FIG. 1, where reference number 10 indicates the roller in general, while reference number 12 indicates the layer of agglomerate which surrounds the external surface of the core, which is preferably made of steel and designated by reference number 14. In case of rollers 10 for use in the clod-breaking devices, the outer diameter is of about 300 mm and the length of about 1.5 m. As regards the coating of agglomerate 12, it preferably has a thickness of about 20-30 mm, while the steel core 14 has a thickness of about 15-20 mm. The roller 10 has an outer surface of a high hardness so that it suffer a lower wear rate than the rollers made of conventional materials and does not release substances which may pollute, at least in terms of coloring, the material which is subject to the action of the roller. The core 14 may comprise roughness 14a, grooves, 14b, and/or ribs 14c at the surface that is in contact with layer of agglomerate 12.

It is worth noting that, in the already mentioned application in clod-breaking devices, where the conventional rollers periodically undergo cleaning of the remnants of mixture by means of a cleaning tool running along the surface of the roller at a distance of a few millimeters therefrom, in the case of the rollers according to the present invention, it is possible to envisage providing the cleaning tool, which is subject to a translatory motion, with means adapted to perform, in addition to cleaning, also a slight grinding of the roller surface, thus restoring optimum operating conditions.

As already mentioned above, the present invention is applicable not only to the rollers used on clod-breaking devices, but also in all the other cases where it is required to perform the crushing of wearing materials and/or to avoid the release of substances which may pollute the material being processed by the rollers.

The invention has been described in relation to a preferred embodiment, it being understood that conceptually equivalent modifications and variations, as regards both the structure and applications, are possible and may be envisaged within the scope of protection of the following claims. For example the rollers manufactured according to the present invention may be used in other applications where a high surface hardness and low or zero pollution of the material being processed are required. It is equally possible to manufacture rollers formed entirely of agglomerate, in which case, according to the manufacturing method, the core arranged inside the cavity of the casing or formwork has a temporary function and is extracted from the roller once hardening of the agglomerate has been completed.

I claim:

1. A roller for crushing one of clods and aggregates formed in mixtures of granulated stone materials and a binder, the roller comprising:

a central core; and an outer layer surrounding the core, the outer layer comprising a compacted mix of a granulated stone material and the binder, the outer layer having a hardness suitable to crush one of clods and aggregates formed in mixtures of granulated stone materials and the binder, the outer layer comprising an agglomerate;

wherein the outer layer is prepared by compaction together with a vibratory motion under vacuum;

wherein the layer is integrally provided with an external surface which is non-porous and does not release metal oxide; and wherein the binder comprises a hardenable resin.

2. A roller according to claim 1, wherein the layer comprises quartziferous aggregates.

3. A roller according to claim 2, wherein the layer comprises granules of a particle size of between 0.1 and 2.0 mm.

4. The roller of claim 2, wherein the quartziferous aggregate comprises a hardness of at least 7 Mohs.

5. A roller according to claim 1, wherein said central core is made of steel and an external surface of said central core in contact with said layer is roughened.

6. A roller according to claim 5, wherein said external surface is sand blasted rough.

7. A roller according to claim 1, wherein an external surface of said central core is provided with one of grooves and ribbing for gripping.

8. The roller of claim 1, wherein the layer is further prepared by vibratory motion under vacuum.

9. The roller of claim 1, wherein the core comprises a thickness in a range of 15-20 mm.

10. The roller of claim 1, wherein the outer layer comprises a thickness in a range of 20-30 mm.

11. A roller for crushing one of clods and aggregates formed in mixtures of granulated stone materials and a binder, the roller comprising:

a central core; and an outer layer surrounding the core, the outer layer having a hardness suitable to crush one of clods and aggregates formed in mixtures of granulated stone materials and binders, the outer layer comprising an agglomerate and being prepared in one of a formwork or casing having an internal cavity with a shape and size corresponding to the external shape of the roller to be manufactured, wherein the central core is inserted into the internal cavity to create an interspace having a thickness corresponding to the thickness of the roller; the interspace being filled with a mixture constituting the outer layer;

wherein the outer layer comprises a compacted mix of a granulated stone material and the binder;

wherein the outer layer is prepared by compaction together with a vibratory motion under vacuum;

wherein the outer layer is integrally provided with an external surface which is non-porous and does not release metal oxide;

wherein the binder comprises a hardenable resin.

12. The roller of claim 11, wherein the granulated stone materials comprise a quartziferous aggregate comprising a hardness of at least 7 Mohs.

13. The roller of claim 11, wherein the outer layer comprises quartziferous aggregates.

14. The roller of claim 13, wherein the outer layer comprises granules of a particle size of between 0.1 and 2.0 mm.

15. The roller of claim 11, wherein said central core comprises steel and an external surface of said central core in contact with said layer is roughened.

16. The roller of claim 15, wherein said external surface is sand blasted rough.

17. The roller of claim 16, wherein an external surface of said central core is provided with one of grooves and ribbing for gripping.

18. The roller of claim 11, wherein core comprises a thickness in a range of 15-20 mm.

19. The roller of claim 11, wherein the outer layer comprises a thickness in a range of 20-30 mm.

20. A method of making a roller for crushing one of clods and aggregates formed in mixtures of granulated stone materials and a binder, the roller comprising:

a central core; and a layer surrounding the core, the layer having a hardness suitable to crush one of clods and aggregates formed in mixtures of granulated stone materials and binders, the layer comprising an agglomerate;

wherein the outer layer comprises a compacted mix of a granulated stone material and the binder;

wherein the layer is integrally provided with an external surface which is non-porous and does not release metal oxide; and wherein the binder comprises a hardenable resin;

the method comprising the steps of:

(a) preparing a casing or formwork having an internal cavity with a shape and size corresponding to the external shape of the roller;

(b) inserting into said internal cavity said central core to create an interspace with a mixture constituting the outer layer;

(c) compacting the mixture; and (d) extracting the roller from the casing or formwork.

21. The method of claim 20, wherein step (c) is performed with vibro-compaction.

22. The method of claim 20, wherein step (c) is performed under vacuum.

23. The method of claim 20, wherein between steps (c) and (d) is a step of hardening the binder.

* * * * *

UNITED STATES PATENT AND TRADEMARK OFFICE
CERTIFICATE OF CORRECTION

PATENT NO. : 7,766,807 B2
APPLICATION NO. : 10/861056
DATED : August 3, 2010
INVENTOR(S) : Dario Toncelli It is certified that error appears in the above-identified patent and that said Letters Patent is hereby corrected as shown below:

The following are added to the Title page of the patent in the left column:

Item -- (30)    Foreign Application Priority Data

Apr. 18, 2002 (IT) ..........................TV2002A000044 --

Signed and Sealed this

Nineteenth Day of October, 2010

David J. Kappos
*Director of the United States Patent and Trademark Office*